United States Patent
Motz et al.

(10) Patent No.: US 10,814,528 B2
(45) Date of Patent: *Oct. 27, 2020

(54) FLEXIBLE MAT FORMING SYSTEM AND METHOD

(71) Applicant: Motz Enterprises, Inc., Cincinnati, OH (US)

(72) Inventors: James G. Motz, Palacios, TX (US); Matthew J. Motz, Cincinnati, OH (US)

(73) Assignee: MOTZ ENTERPRISES, INC., Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/277,540

(22) Filed: Feb. 15, 2019

(65) Prior Publication Data

US 2019/0176373 A1   Jun. 13, 2019

Related U.S. Application Data

(63) Continuation of application No. 15/048,539, filed on Feb. 19, 2016, now Pat. No. 10,239,240.

(51) Int. Cl.
*B28B 5/10* (2006.01)
*B28B 13/02* (2006.01)
(Continued)

(52) U.S. Cl.
CPC .............. *B29C 39/16* (2013.01); *B09B 1/004* (2013.01); *B28B 5/10* (2013.01); *B28B 23/0012* (2013.01);
(Continued)

(58) Field of Classification Search
CPC ........ B29D 39/14; B29D 39/16; B29D 39/18; B29D 41/26; B29D 41/30; B28B 5/10;
(Continued)

(56) References Cited

U.S. PATENT DOCUMENTS 1,451,229 A   4/1923   Loudenslager
3,332,187 A   7/1967   Arcari
(Continued)

FOREIGN PATENT DOCUMENTS

AU   2015100623   6/2015
EP       0123737   11/1984
(Continued)

OTHER PUBLICATIONS

AU, Examination Report No. 1, Australian Application No. 2017238225 (dated Mar. 5, 2019).
(Continued)

*Primary Examiner* — James P Mackey
(74) *Attorney, Agent, or Firm* — Thompson Hine LLP

(57) ABSTRACT

In an exemplary embodiment, a flexible mat forming system includes a rotating drum having a plurality of mold cavities about an outer periphery thereof; a hopper positioned adjacent the drum, the hopper shaped to receive a hardenable paste and deposit the hardenable paste into successive mold cavities of the plurality of mold cavities facing the hopper, as the drum rotates relative to the hopper; wherein the hopper includes an opening shaped and positioned to align with the mold cavities facing the hopper; and a sheet of mesh material that is fed between the hopper and the mold cavities facing the hopper.

20 Claims, 8 Drawing Sheets

(51) Int. Cl.

| | | |
|---|---|---|
| *B29C 39/16* | (2006.01) | |
| *B29C 39/14* | (2006.01) | |
| *B29C 39/18* | (2006.01) | |
| *B28B 23/00* | (2006.01) | |
| *B29C 41/26* | (2006.01) | |
| *B29C 41/30* | (2006.01) | |
| *E02D 17/20* | (2006.01) | |
| *E02B 3/12* | (2006.01) | |
| *B09B 1/00* | (2006.01) | |
| *B29K 105/20* | (2006.01) | |
| *B29L 31/10* | (2006.01) | |

(52) U.S. Cl.
CPC .............. *B29C 39/14* (2013.01); *B29C 39/18* (2013.01); *B29C 41/26* (2013.01); *B29C 41/30* (2013.01); *E02B 3/121* (2013.01); *E02B 3/123* (2013.01); *E02D 17/202* (2013.01); *B28B 13/02* (2013.01); *B28B 13/029* (2013.01); *B29K 2105/206* (2013.01); *B29L 2031/10* (2013.01)

(58) Field of Classification Search
CPC ... B28B 13/02; B28B 13/029; B28B 23/0012; E02B 3/121; E02B 3/123; E02D 17/202; B29C 39/14; B29C 39/16; B29C 39/18; B29C 41/26; B29C 41/30
See application file for complete search history.

(56) References Cited

U.S. PATENT DOCUMENTS

| | | | |
|---|---|---|---|
| 3,477,108 A | 11/1969 | Stokes | |
| 3,720,493 A | 3/1973 | Borcoman et al. | |
| 3,970,204 A | 7/1976 | Lutz | |
| 3,981,669 A | 9/1976 | Gambill et al. | |
| 4,311,273 A | 1/1982 | Marsh | |
| 4,475,648 A | 10/1984 | Weeks | |
| 4,859,516 A | 8/1989 | Yamanaka et al. | |
| 5,039,250 A | 8/1991 | Janz | |
| 5,048,640 A | 9/1991 | McConville et al. | |
| 5,064,584 A | 11/1991 | Jefferies | |
| 5,082,397 A | 1/1992 | Raviv | |
| 5,443,329 A | 8/1995 | de Geeter | |
| 5,501,753 A | 3/1996 | Stark | |
| 5,554,393 A | 9/1996 | Uchida et al. | |
| 5,911,539 A | 6/1999 | Egan | |
| 6,095,320 A | 8/2000 | DeMong et al. | |
| 6,517,294 B2 | 2/2003 | Vreeland | |
| 6,793,858 B2 | 9/2004 | Motz | |
| 6,945,739 B1 | 9/2005 | Putnam | |
| 7,634,877 B2 | 12/2009 | Wiercinski | |
| 10,161,094 B2 | 12/2018 | Motz | |
| 10,239,240 B2 * | 3/2019 | Motz | ...................... B29C 39/18 |
| 2002/0180076 A1 | 12/2002 | Motz | |
| 2011/0042844 A1 | 2/2011 | Brown et al. | |
| 2013/0101354 A1 | 4/2013 | Lignier | |

FOREIGN PATENT DOCUMENTS

| | | |
|---|---|---|
| EP | 0192861 A1 | 9/1986 |
| FR | 2261873 | 9/1975 |
| JP | 2-308061 | 12/1990 |
| KR | 20050019161 | 3/2005 |
| WO | 2011/0134476 | 11/2011 |

OTHER PUBLICATIONS

CA, Office Action, Canadian Application No. 3,018,841 (dated Mar. 29, 2019).
AU, Notice of Acceptance, Australian Application No. 2017238225 (dated Jun. 24, 2019).
EP, Search Report, European Application No. 17771110.8, 7 pages (dated Aug. 29, 2019).
AU, Notice of Acceptance, Australian Application No. 2017257882 (dated Sep. 13, 2019).
CA, Office Action, Canadian Patent Application No. 3,018,841 (dated Oct. 18, 2019).
Product Overview featuring "Fornit® 30/30", by Huesker Engineering with Geosynthetics, 1 page (at least as early as Apr. 17, 2018).
CA, Notice of Allowance, Canadian Patent Application No. 3,014,296 (dated Jul. 8, 2019).
EP, Search Report, European Application No. 17753813.9, 7 pages (dated Aug. 26, 2019).
PCT, International Search Report and Written Opinion, International Application No. PCT/US2017/018122, 12 pages (dated Jun. 19, 2017).
Webpage featuring "Recyclex® TRM and Recyclex® TRM-V," by American Excelsior Company, http://americanexcelsior.com/product/?sub=15 (retrieved from the internet on Aug. 25, 2015).
U.S., Office Action, U.S. Appl. No. 15/048,539 (dated Nov. 2, 2017).
U.S., Office Action, U.S. Appl. No. 15/048,539 (dated Jun. 26, 2018).
U.S., Notice of Allowance, U.S. Appl. No. 15/048,539 (dated Nov. 15, 2018).
Product Overview featuring "High Performance Geosynthetics", by Enka® Solutions (Aug. 2016).
PCT, International Search Report and Written Opinion, International Application No. PCT/US2017/023710, 13 pages (dated Jun. 19, 2017).
U.S., Notice of Allowance, U.S. Appl. No. 15/467,516 (dated Nov. 5, 2018).
U.S., Office Action, U.S. Appl. No. 15/467,516 (dated Sep. 13, 2018).
U.S., Advisory Action, U.S. Appl. No. 15/467,516 (dated Sep. 4, 2018).
U.S., Office Action, U.S. Appl. No. 15/467,516 (dated May 11, 2018).
U.S., Office Action, U.S. Appl. No. 15/467,516 (dated Jan. 12, 2018).
CA, Office Action, Canadian Patent Application No. 3,014,926, 4 pages (dated Mar. 31, 2020).
European Patent Office, European Search Report and European Search Opinion, European Patent Application No. 20157246.8, 11 pages (dated Jul. 17, 2020)

* cited by examiner

FLEXIBLE MAT FORMING SYSTEM AND METHOD

TECHNICAL FIELD

The present disclosure relates to systems and methods for forming flexible tied block mats, and more particularly, to systems and methods for forming continuous flexible tied block erosion control mats.

BACKGROUND

Erosion is a natural process in which meteorological elements such as rain, wind, and snow remove soil, rock, and dissolved material from one location on the Earth's crust and transport it to another location. While such erosion is a natural process, certain localized human activity increases the rate of erosion to many times that at which erosion occurs naturally. Land surfaces adjacent man-made structures such as canals, roads, reservoirs and ponds, and artificially created drainage channels and other waterways are particularly susceptible to erosion because naturally occurring indigenous vegetation is removed in order to form the structures.

Erosion can be mitigated in these areas by remediation of the land surface adjacent the canal, road, or channel by planting vegetation to replace the vegetation that was stripped away during construction. However, there is a time interval between the planting of the replacement vegetation and the point at which the replacement vegetation is sufficiently developed to prevent further erosion of surface soil during which further erosion may occur.

Efforts have been made to retain the surface soil in place in these areas until such time as vegetation can mature to the point where the root structure of the vegetation retains the soil in place. An example of such material is the flexible mat structure disclosed in U.S. Pat. No. 6,793,858 titled "Method and Apparatus for Forming a Flexible Mat Defined by Interconnected Concrete Panels," the entire contents of which are incorporated herein by reference. That patent discloses a flexible mat structure in the form of spaced, interconnected concrete panels or blocks held together by an open mesh of a polymeric material.

The flexible mat structure may be made by depositing concrete in the block-shaped mold cavities formed in the surface of a rotating drum and embedding in the concrete material the open mesh structure. While the method is effective, there is a need to introduce additional efficiencies in the manufacture of such flexible mat structure.

SUMMARY

The present disclosure describes a flexible mat forming system and method in which improvements have been made to increase the quality of the flexible mat product produced and the efficiency in the process of manufacturing the flexible mat. One type of mat produced by the process and system is known as a tied block mat, in which blocks of cement are cast in a pattern onto a sheet of geogrid. Such a tied block mat is ideal for applying to the ground adjacent airport runways, taxiways and terminals, roadbeds, and the banks of reservoirs, canals, rivers and other waterways, shorelines, and any sloped surface to control erosion. In some embodiments, the system and process produces a tied block mat that is sufficiently sturdy to function as a drivable surface.

In one embodiment, a flexible mat forming system includes a rotating drum having a plurality of mold cavities about an outer periphery thereof; a hopper positioned adjacent the drum, the hopper shaped to receive a hardenable paste and deposit the hardenable paste into successive mold cavities of the plurality of mold cavities facing the hopper, as the drum rotates relative to the hopper; wherein the hopper includes an opening shaped and positioned to align with the mold cavities facing the hopper; and a sheet of mesh material that is fed between the hopper and the mold cavities facing the hopper.

In another embodiment, a method for making a flexible mat includes providing a plurality of mold cavities; providing a panel having an opening; positioning the panel above the mold cavities and aligning the opening with the mold cavities; placing a sheet of mesh material between the panel and the mold cavities; depositing a hardenable paste through the opening and into the mold cavities such that the sheet of mesh material becomes embedded in the hardenable paste over the mold cavities; displacing the panel from the mold cavities as the hardenable paste hardens in the mold cavities into blocks held together by the mesh, thereby forming the flexible mat; and removing the flexible mat from the mold cavities.

In yet another embodiment, a system for making a flexible mat includes a form having a plurality of mold cavities; a panel having an opening; a support frame for adjustably supporting the panel above the plurality of mold cavities and aligning the slots adjacent ones of the mold cavities; and the panel is spaced above the mold cavities a distance sufficient to receive a sheet of mesh material between the panel and the mold cavities.

In still another embodiment, a method for making a flexible mat includes providing a plurality of mold cavities; providing a panel having an opening; positioning the panel above the mold cavities and aligning the opening with adjacent ones of the mold cavities, wherein positioning the panel above adjacent ones of the mold cavities includes adjusting a height of the panel above the mold cavities to a selected spacing; placing a sheet of mesh material between the panel and the mold cavities; depositing a hardenable paste through the opening and into the mold cavities such that the sheet of mesh material becomes embedded in the hardenable paste over the mold cavities; allowing the hardenable paste to harden into blocks held together by the mesh, thereby forming the flexible mat; and removing the flexible mat from between the panel and the mold cavities.

Other objects and advantages of the disclosed flexible mat forming system will be apparent from the following description, the accompanying drawings, and the appended claims.

DETAILED DESCRIPTION

Figure 1:
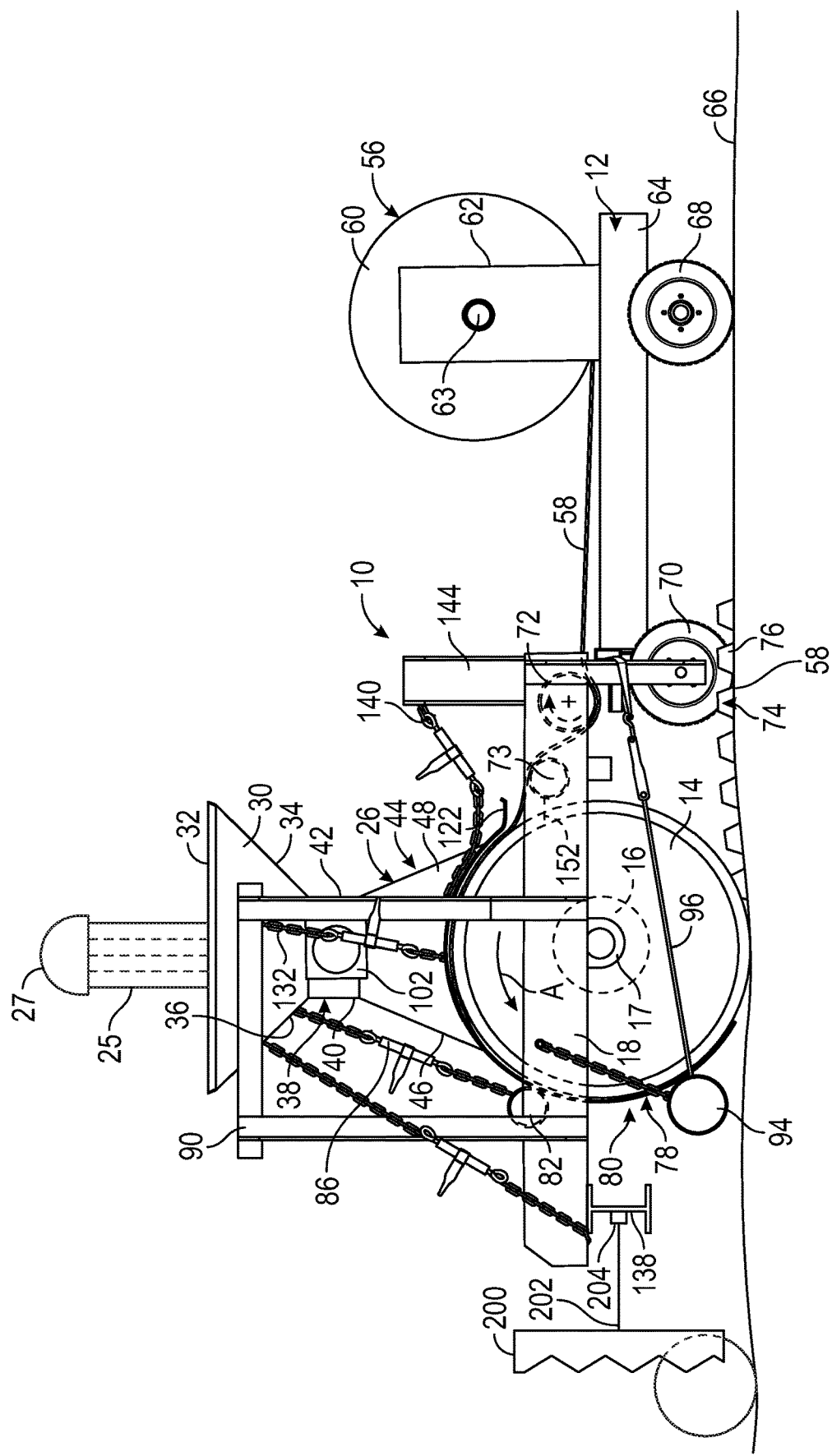
FIG. 1 is a schematic, side elevational view of an embodiment of the disclosed flexible mat forming system.
Figure 2:
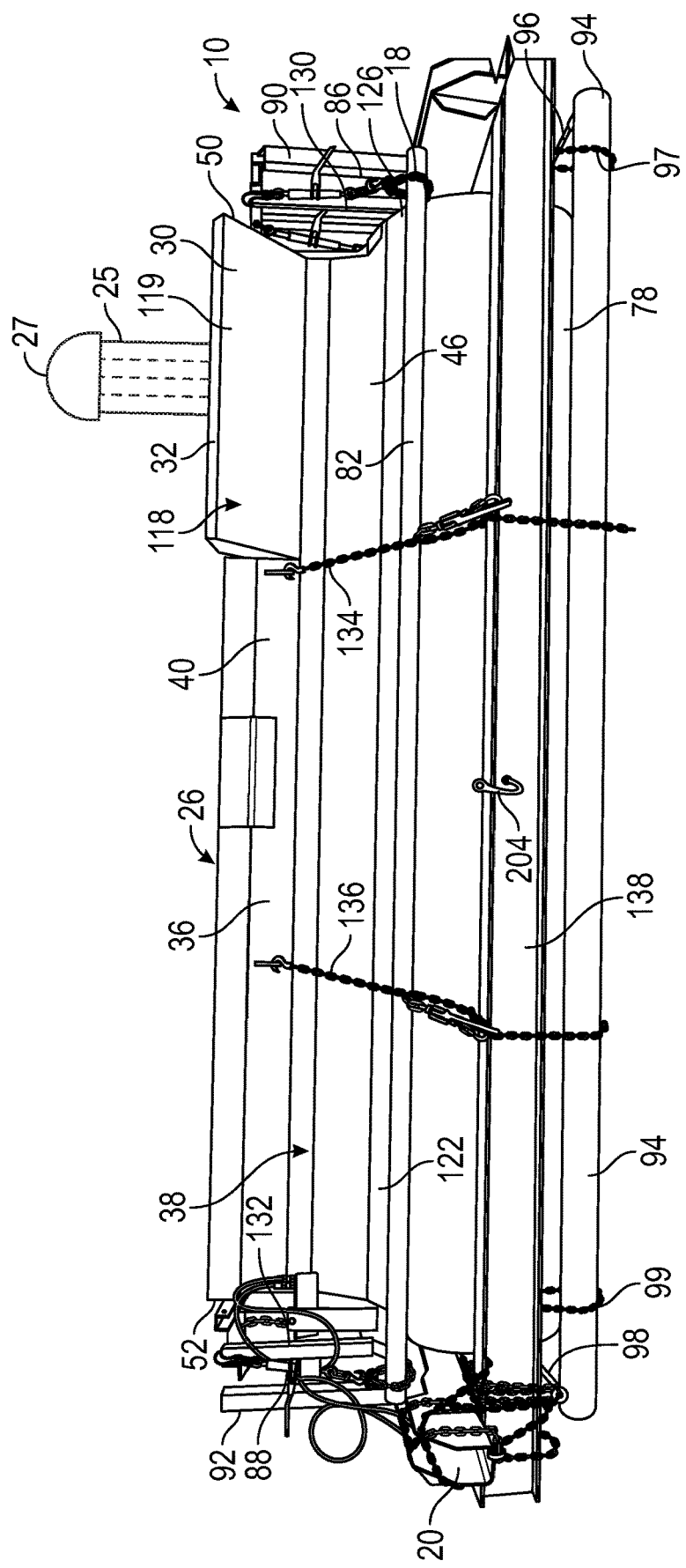
FIG. 2 is a schematic, front elevational view of the flexible mat forming system of FIG. 1.
Figure 3:
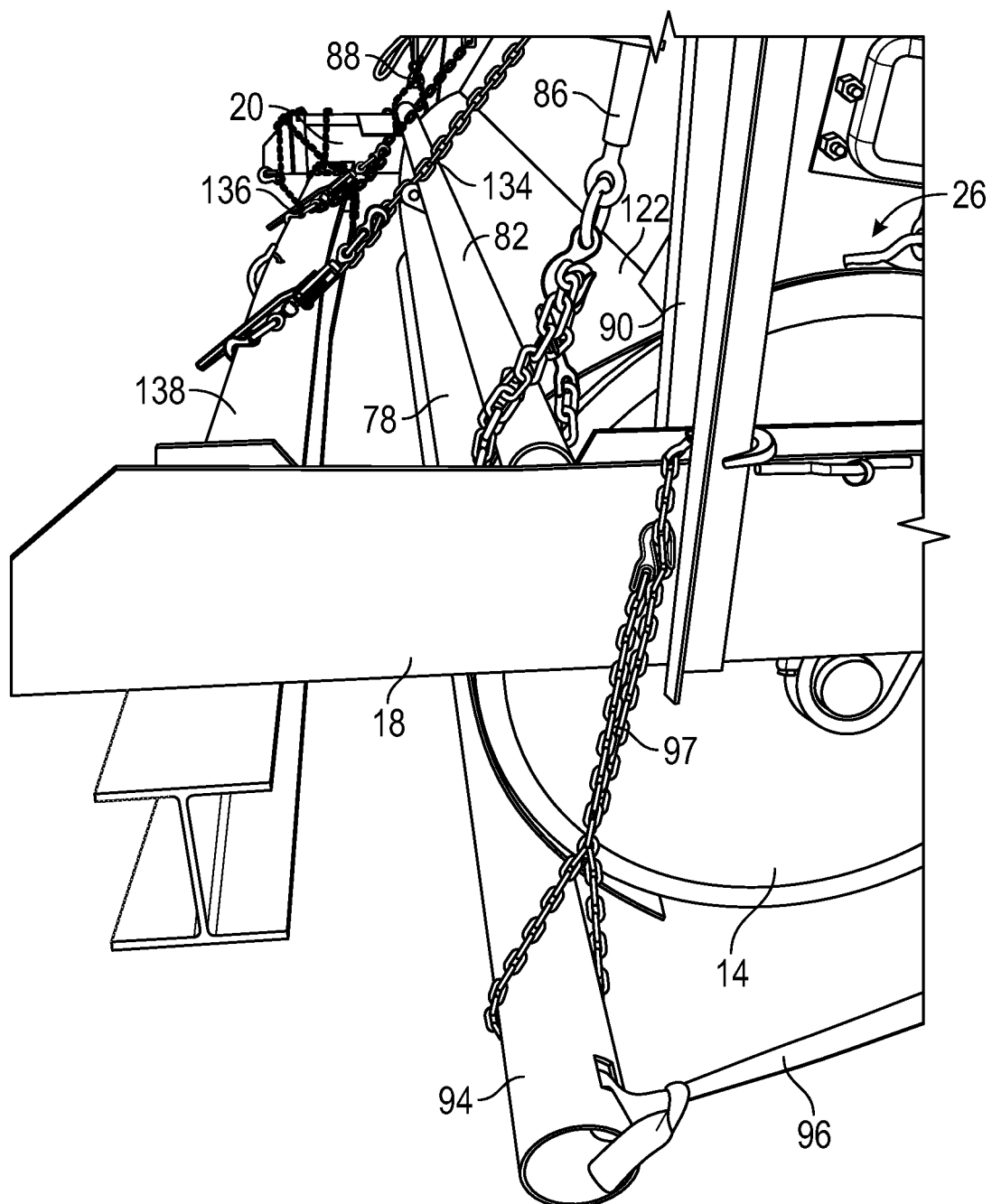
FIG. 3 is a detail perspective view of the flexible mat forming system of FIG. 1, showing the retaining plate.
Figure 4:
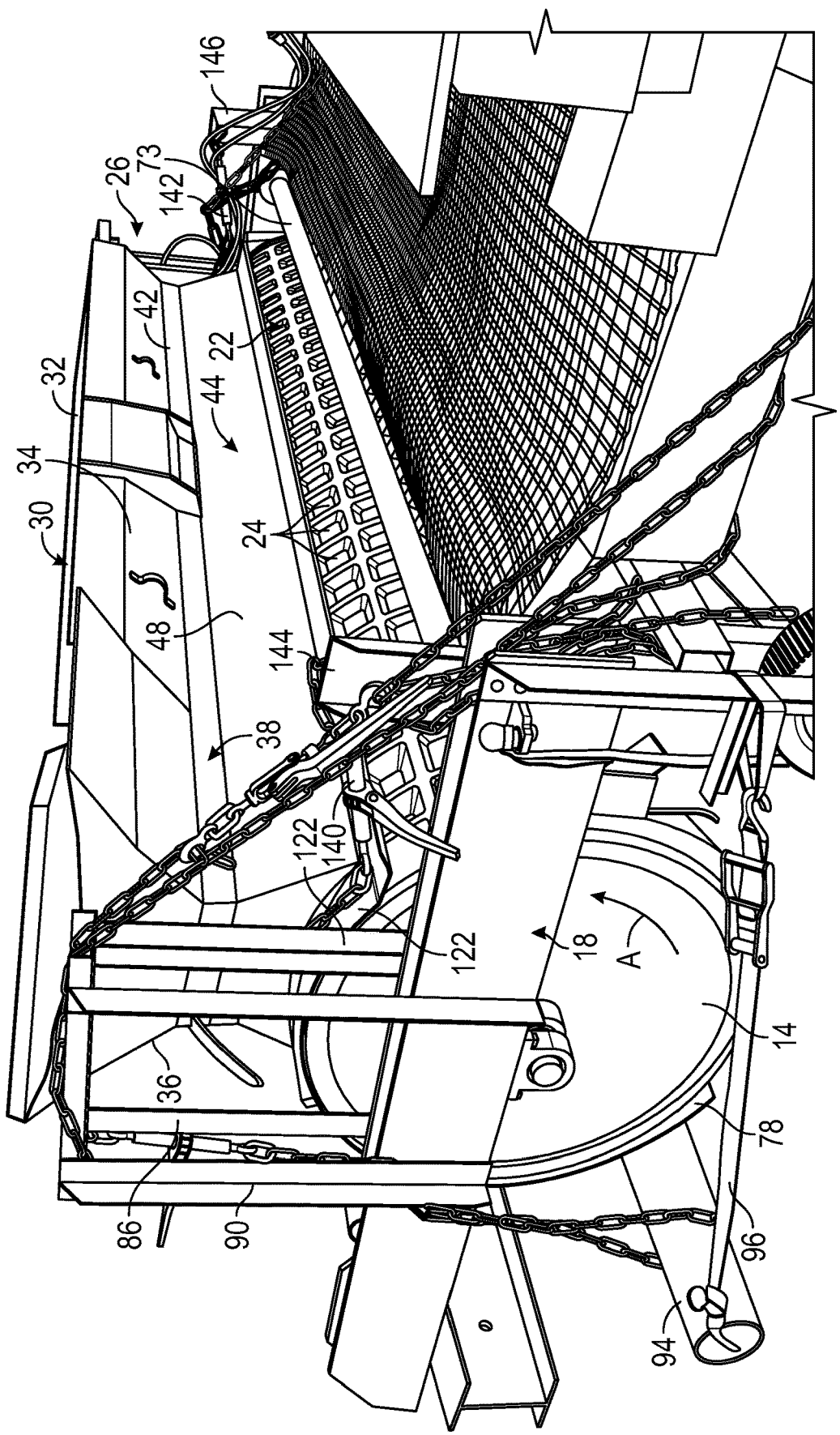
FIG. 4 is a perspective view of the flexible mat forming system of FIG. 1, taken from the rear of the hopper and drum.

The disclosed flexible mat forming system, generally designated 10, is shown in FIGS. 1, 2, and 4. The system 10 may include a frame 12 on which is mounted an elongate, rotatable cylindrical drum 14. The drum 14 may be rotated by a motor 16, which in embodiments may be an electric motor or a hydraulic motor, in which case the system 10 is self-propelled, or assists in propelling itself. The motor 16 may rotate the drum in a counterclockwise direction, as indicated by arrow A in FIGS. 1 and 4. In other embodiments, system 10 does not have a motor 16, but instead the drum 14 rests on the ground 66 and rotates in the direction of arrow A as a result of friction with the ground from the frame 12 being pulled over the ground, which in FIG. 1 would be to the left. In an embodiment, the frame 12 may include a pair of horizontal beams 18, 20 on which the drum 14 is rotatably mounted, for example by a journal bearing 17.

As shown in FIG. 4, in an exemplary embodiment, the drum 14 includes a plurality of transverse rows 22 of mold cavities 24 that are formed about the outer periphery, or cylindrical outer surface, of the drum. In other embodiments, the mold cavities 24 are arranged in a pattern or patterns on the drum. In embodiments, the patterns are selected from a rectilinear, transverse row of the mold cavities, a staggered pattern of the mold cavities, a checked pattern of the mold cavities, a random pattern of the mold cavities, a running bond pattern of the mold cavities, and combinations of the foregoing. With such embodiments, the term transverse row 22, as used herein, includes any spacing or arrangement or pattern of the mold cavities 24 along the length of the outer periphery of the drum 14, including the aforementioned patterns, and is not limited to a rectilinear row parallel to a central rotational axis of the drum 14.

Accordingly, the drum 14, which in embodiments takes the form of an elongated cylinder, is a form having mold cavities 24. In embodiments, the mold cavities 24 may be shaped to receive hardenable paste 25 from a chute 27 (see FIGS. 1 and 2) from the drum of a concrete transport truck, or from a concrete pump, or from a concrete mixer trailer, and form the hardenable paste 25 blocks 76, which in embodiments may be square at their base. For example, the mold cavities 24 may be shaped to form pyramidal blocks 76 of hardenable paste 25 received from the hopper 26 having square bases 6½"×6½" and 2¼" high, although the mold cavities may have other shapes and dimensions. For example, the mold cavities 24 may be shaped to form blocks 76 having shapes selected from rectangular, square, hexagonal, octagonal, round, elliptical, irregular, and combinations of the foregoing.

As shown in FIGS. 1, 2, and 4, the system 10 also may include an elongate hopper, generally designated 26, adjacent the drum 14. In an embodiment, the hopper 26 is positioned directly above the drum at the 12 o'clock position, such that the hopper is positioned above an uppermost one of the plurality of transverse rows 22 of mold cavities 24. In other embodiments, the hopper 26 is positioned relative to the drum 14 upstream of the 12 o'clock position, for example at the 2 o'clock position, and in still other embodiments, the hopper is positioned relative to the drum 14 downstream of the 12 o'clock position, for example at the 10 o'clock position. In other embodiments, the hopper 26 is positioned adjacent the drum 14 in locations between the 3 o'clock position and the 9 o'clock position.

In an embodiment, the hopper 26 is shaped to receive a hardenable paste 25 and deposit the hardenable paste into mold cavities 24 facing the hopper. In an embodiment in which the mold cavities 24 are arranged in rectilinear transverse rows 22, the hopper 26 deposits the hardenable paste 25 along a facing row 28 (see FIG. 7) of the plurality of transverse rows 22 of mold cavities 24. The hopper 26 may include an open upper portion 30 having an open top 32 and downwardly extending and converging front and rear walls 34, 36, respectively. The hopper 26 may include a central section 38 having front and rear walls 40, 42, respectively, shaped to form a trough with an arcuate bottom, and a lower section 44 having downwardly and outwardly diverging front and rear walls 46, 48, respectively.

Figure 5:
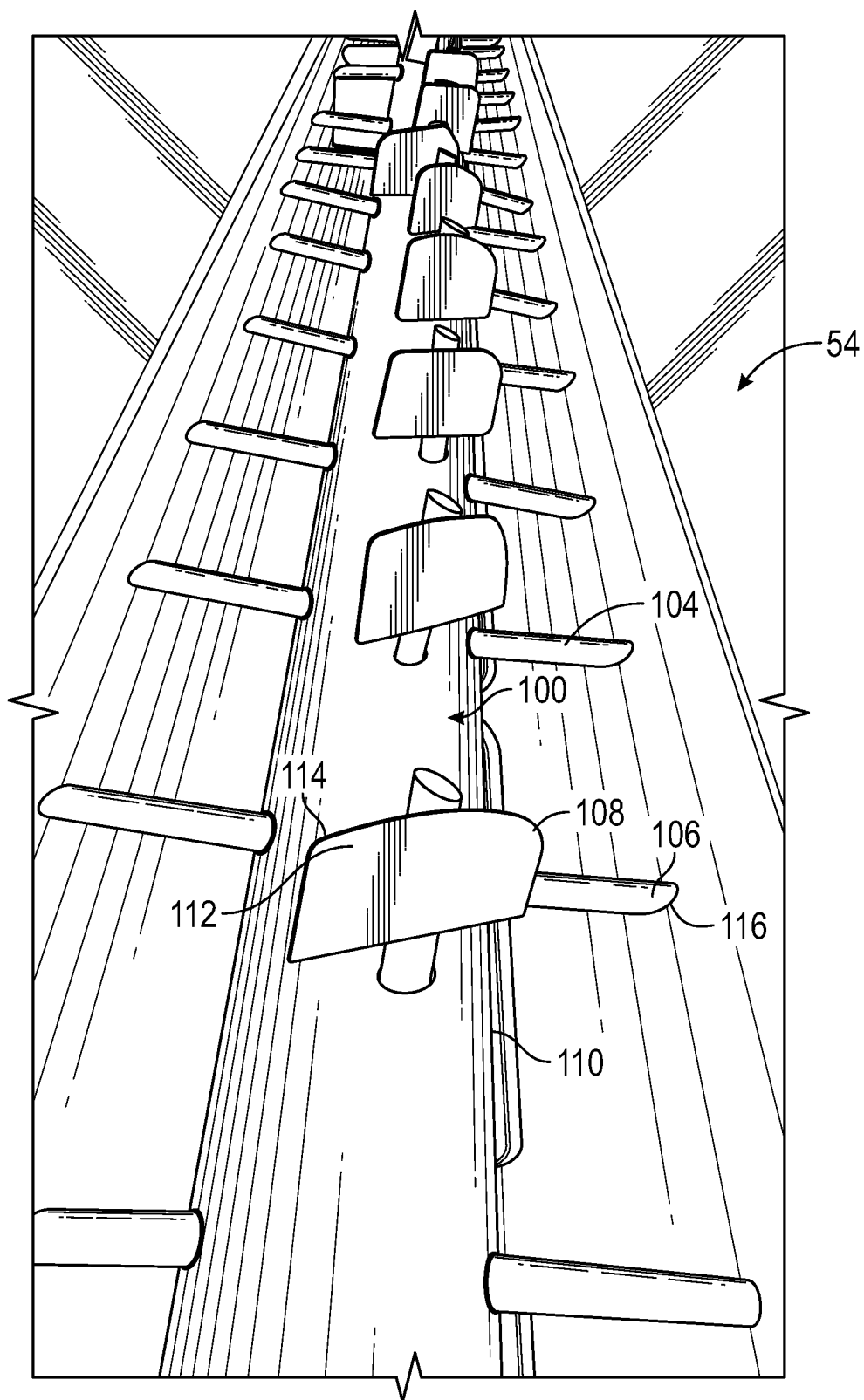
FIG. 5 is a detail showing an embodiment of a rotating auger located within the hopper of the flexible mat forming system of FIG. 1.
Figure 6:
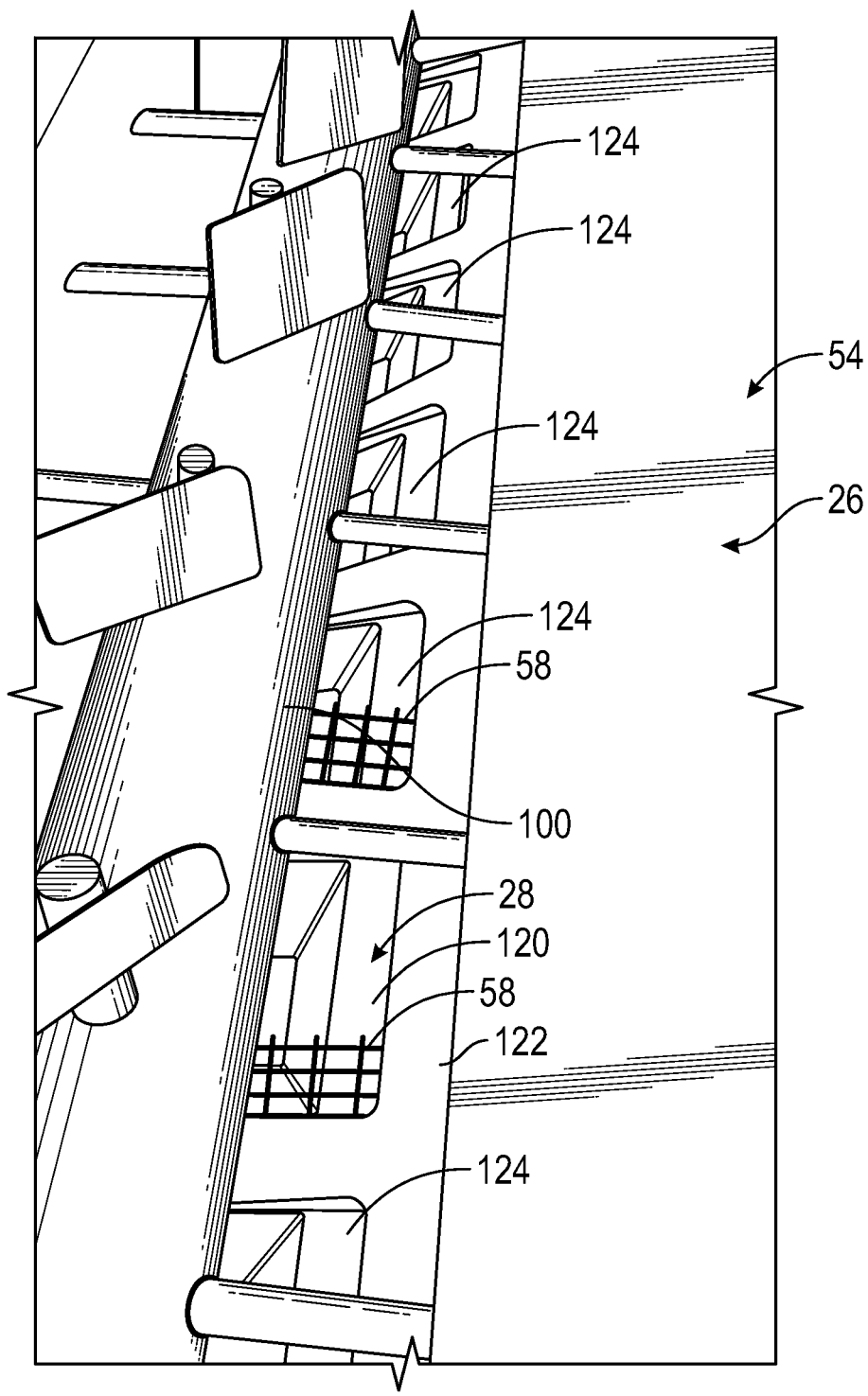
FIG. 6 is a detail perspective view of a section of the hopper of FIG. 5.

Front and rear walls 34, 36 of the hopper 26 define frontward and rearward facing surfaces, respectively. Side walls 40, 42 define forward and rearward facing walls, respectively, and walls 48, 46 define forward and rearward facing walls, respectively. The side walls 34, 36, 40, 42, 46, 48 are closed by lateral walls 50, 52 to define an interior chamber 54, as shown in FIGS. 5 and 6. In embodiments, the hopper 26 includes a bottom panel 122 that in some embodiments is shaped to conform to the curvature of the outer periphery of the drum 14. As will be described, in embodiments the arcuate shape of the bottom panel 122 may support the remainder of the hopper 26 on top of the drum 14, and in other embodiments, permit a close spacing between the hopper and the top of the drum.

In embodiments, the system 10 includes a support, generally designated 56, which takes the form of a spool assembly having a spindle or rotating axle, for supporting a sheet 58 of a mesh material, from a roll 60 on the spool assembly 56, between the hopper 26 and the facing row 28 (see FIG. 7) of the plurality of transverse rows 22 of mold cavities 24. In embodiments, the spool assembly 56 includes a pair of posts 62 to which a spindle or axle 63 is attached and extends therebetween. The support 56 may be mounted on a rear platform 64 of the frame 12. In an exemplary embodiment, the rear platform 64 is supported above the ground 66 by a pair of rear wheels 68 and a pair of front wheels 70. In embodiments, the spindle 63 is mounted on the posts 62 for free rotation relative to the support; in other embodiments the spindle is motorized to assist in paying out the sheet 58.

The sheet 58 of mesh material may, in an embodiment, be a sheet of open mesh material, and in other embodiments be a sheet of a polymer mesh, which may be a bi-axial geogrid material such as polyester or polypropylene. An example of such a polypropylene mesh is Fornit 30/30 geogrid manufactured by Huesker Inc. of Charlotte, N.C. In an embodiment, the sheet 58 of mesh material may be fed forwardly, that is, to the left in FIG. 1, under guide tube 72, which is mounted on the frame 12 and extends transversely adjacent the drum 14, and either over or under a second transverse guide tube 73, where it continues, passing beneath the hopper 26 and above the drum 14.

A hardenable paste 25 deposited into the open top 32 of the hopper 26, and in an exemplary embodiment falls downwardly through the hopper and into the facing row 28 of the plurality of transverse rows 22 where it is retained within the mold cavities 24. In embodiments, the hardenable paste 25 is a fresh cement paste such as Portland cement, and in a particular embodiment, is 5000 psi., wet-cast Portland cement. In other embodiments, the hardenable paste 25 is selected from concrete, a mixture of Portland cement, sand, and/or gravel, and a polymer. The sheet 58 of mesh material becomes embedded in the hardenable paste 25 and the combination of mesh and paste continues as the drum 14 rotates in the direction of arrow A in a downstream direction away from the hopper 26 where the paste hardens and the combination of mesh and paste leaves the lower portion of the drum 14 as a flexible mat, generally designated 74, of blocks 76 of hardened paste material held together by the sheet 58 of geogrid mesh, also known as a tied concrete (i.e., hydraulic Portland cement) block mat when concrete is used as the hardenable paste 25. A sheet of such a tied block mat is suitable for applying to the ground for purposes of erosion control.

As shown in FIGS. 1, 2, 3, and 4, in an embodiment, a retaining plate, generally designated 78, extends partially about the outer periphery of the drum 14 and is positioned on the downstream side 80 of the drum and hopper 26. The retaining plate 78 may be spaced sufficiently close to the outer periphery of the drum to retain the sheet 58 of mesh material against the outer periphery of the drum and the hardenable paste 25 within the mold cavities 24 passing between the retaining plate and the outer periphery of the drum 14.

In an embodiment, the retaining plate 78 may be shaped to conform to the curvature of the outer periphery of the drum 14. Also in an embodiment, the retaining plate may be imperforate, comprising a single sheet of curved sheet metal. In other embodiments, the retaining plate 78 is made of an aluminum alloy, or a woven or nonwoven mat of a geosynthetic, such as polypropylene, a nylon, other polymers, a polyamide material, or combinations of the foregoing. In the embodiment shown in FIGS. 1-4, the frame 12 supports the drum 14 and hopper 26, and the hopper is positioned above an uppermost one of the plurality of transverse rows 22 of mold cavities 24. Further, the retaining plate 78 may be attached to the frame 12.

The retaining plate 78 may include an upper retaining member, generally designated 82, that may be attached to the frame 12 for holding an upper portion of the retaining plate 78 against the outer periphery of the drum 14. The upper retaining member 82 may include an adjustable connection, which may take the form of adjustable cables or chains 86, 88 having ratchets incorporated therein for manually lengthening and shortening their lengths. The adjustable cables or chains 86, 88 may extend from their upper ends, which may be attached to upright supports 90, 92 of the frame 12 and are attached at their lower ends to the upper retaining member 82.

By adjusting the lengths of the cables or chains 86, 88, the spacing between the retaining plate 78 and the hopper 26 may be adjusted. Further, the spacing between the outer periphery of the drum 14 and the retaining plate 78 may be varied by adjusting the lengths of the cables or chains 86, 88. In an embodiment, the upper retaining member 82 may take the form of an upper retaining bar extending transversely of the retaining plate 78. Another function of the adjustable cables or chains 86, 88 is that they may be lengthened or shortened to adjust the height of the retaining plate 78 above the ground 66. This enables the point at which the flexible mat 74 is no longer held against the outer periphery of the drum 14 and may begin to separate from the drum.

As shown in FIGS. 1-4, the system 10 may include a lower retaining member 94 that holds a lower portion of the retaining plate 78 against the outer periphery of the drum 14.

The lower retaining member 94 may urge a lower edge of the retaining plate 78 against the drum 14 outer periphery. In an embodiment, the lower retaining member 94 may take the form of a lower retaining bar or a round pipe that extends transversely of the retaining plate 78. The lower retaining member 94 may include left and right adjustment arms 96, 98. The adjustment arms 96, 98 may be attached to the frame 12 and be adjustable in length to vary a force exerted by the lower retaining member 94 against the shield 78, and thus the force exerted by the shield against a lower portion of the outer periphery of the drum 14. The adjustment arms 96, 98 may take the form a pair of adjustable straps, each attached to the frame 12.

In embodiments, the lower retaining member 94 may not be attached to the retaining plate 78, but only urged against it, thereby allowing relative slidable movement between the lower retaining member and the shield, for example, in response to height adjustment by cables or chains 86, 88. In such an embodiment, support chains 97, 99, each extending between and interconnecting the lower retaining member 94 and the upright supports 90, 92 of the frame 12, may support the lower retaining member 94 at a pre-set, desired height above the ground 66 and relative to the retaining plate 78.

As shown in FIGS. 1 and 2, the retaining plate 78 may operate to hold the sheet 58 of mesh material, which in an embodiment may be a geogrid or other geosynthetic material, against the outer periphery of the drum 14 as the mesh material and rows 22 of mold cavities 24 pass beneath the hopper 26 in a downstream direction, indicated by arrow A, away from the hopper and extend downwardly toward the ground 66. As the rows of mold cavities 24 pass downstream of the hopper 26, they receive a hardenable paste 25, which in an embodiment may be fresh (i.e., flowable and not yet hardened) cement paste, and the sheet 58 of geogrid mesh material may become embedded in the fresh cement paste, and the cement paste hardens as the drum 14 rotates the combination mesh and cement paste between the shield 78 and drum 14. At the lowermost portion of the drum 14, the paste 25 has hardened, in embodiments at least enough to be dimensionally stable, forming the mesh and block combination 75, also known as a tied concrete block mat, shown in FIG. 1. In embodiments, the paste 25 is formulated to continue to harden after the paste leaves the mold cavities 24 as shown in FIG. 1.

As shown in FIGS. 1, 5, and 6, in an embodiment the hopper 26 includes an auger, generally designated 100, that is positioned in the central section 38 of the hopper. The auger 100 may be rotated by a motor 102 and functions to distribute a hardenable paste 25, such as fresh cement paste, along a length of the hopper 26. In an embodiment, the auger 100 is co-extensive with the length of the facing row 28 of the plurality of transverse rows 22 of mold cavities 24. In an embodiment, the auger 100 includes a plurality of radially extending protrusions, generally designated 104, along its length. In an embodiment, the protrusions include radially extending rods 106 and radially extending paddles 108 arranged alternately along a central shaft 110. In an embodiment, the rods 106 and paddles 108 extend radially from the central shaft 110 and are spaced about the periphery of the central shaft. In an embodiment, the central shaft 110 may be rotatably mounted in the end walls 50, 52 of the hopper 26 (see FIG. 2).

In an exemplary embodiment, the paddles 108 include opposing flat surfaces 112, 114 that are generally planar in shape and are oriented perpendicular, or generally perpendicular, to a central rotational axis of the shaft 110, which is the same as the central axis of the tubular, rectilinear shaft.

The surfaces 112, 114 of the paddles 108, are angled or skewed relative to the central axis of the shaft 110 to displace fresh cement paste deposited in an end of the hopper 26, along its length, to an opposite end of the hopper when the auger 104 is rotated, for example, clockwise as shown in FIGS. 5 and 6. The rods 106 may include beveled ends 116 angled to provide close clearance with the curved inner surface of the hopper 26, in contrast to squared or rounded ends.

With the auger 100, the hopper 26 may be loaded with cement paste 25 at a loading end 118 (FIG. 2) that may be defined by an enlarged feed chute 119. There is no need to distribute hardenable paste 25, such as fresh cement paste, along the entire width of the open top 32 of the hopper 26. Instead, fresh cement paste may be deposited in only a portion, or in embodiments at a single location, of the hopper 26, for example, into the enlarged feed chute 119, and the auger 100 is rotated by the motor 102 so that the angled paddles 108 rotate in the paste to urge and distribute the paste along the length of the hopper 26, whereupon it falls into the mold cavities 24 of the drum 14 through an opening 120. In an embodiment, the opening 120 is formed in the bottom panel 122.

In an embodiment, the paddles 108 may be distributed along the length of the auger 100 and may be attached to the central shaft 110 at regularly spaced intervals. Also in an embodiment, the paddles 108 may be positioned along the length of the shaft 110 so that they are aligned with openings or slots 120 formed in the bottom panel 122 of the hopper 26 as shown in FIG. 6. As shown in FIGS. 5 and 6, the paddles 108 and rods 106 may arranged in alternating relation along the length of the shaft 110. In other embodiments, the paddles 108 may be angled to urge the paste from the center of the hopper 26 outwardly to both sides or opposite ends of the hopper. With such an embodiment, paste may be deposited in a central region of the hopper 26—that is, midway or approximately midway between the ends 50, 52 of the hopper—and rotation of the central shaft 110 may cause the paddles 108 to urge the paste from the center of the hopper 26 to the ends of the hopper. In still other embodiments, the blades 108 may be angled to urge paste deposited into the top 32 at any location along the length of the hopper 26, and may be angled to urge the paste toward the ends 50, 52 of the hopper from the point at which the paste is deposited.

Figure 7:
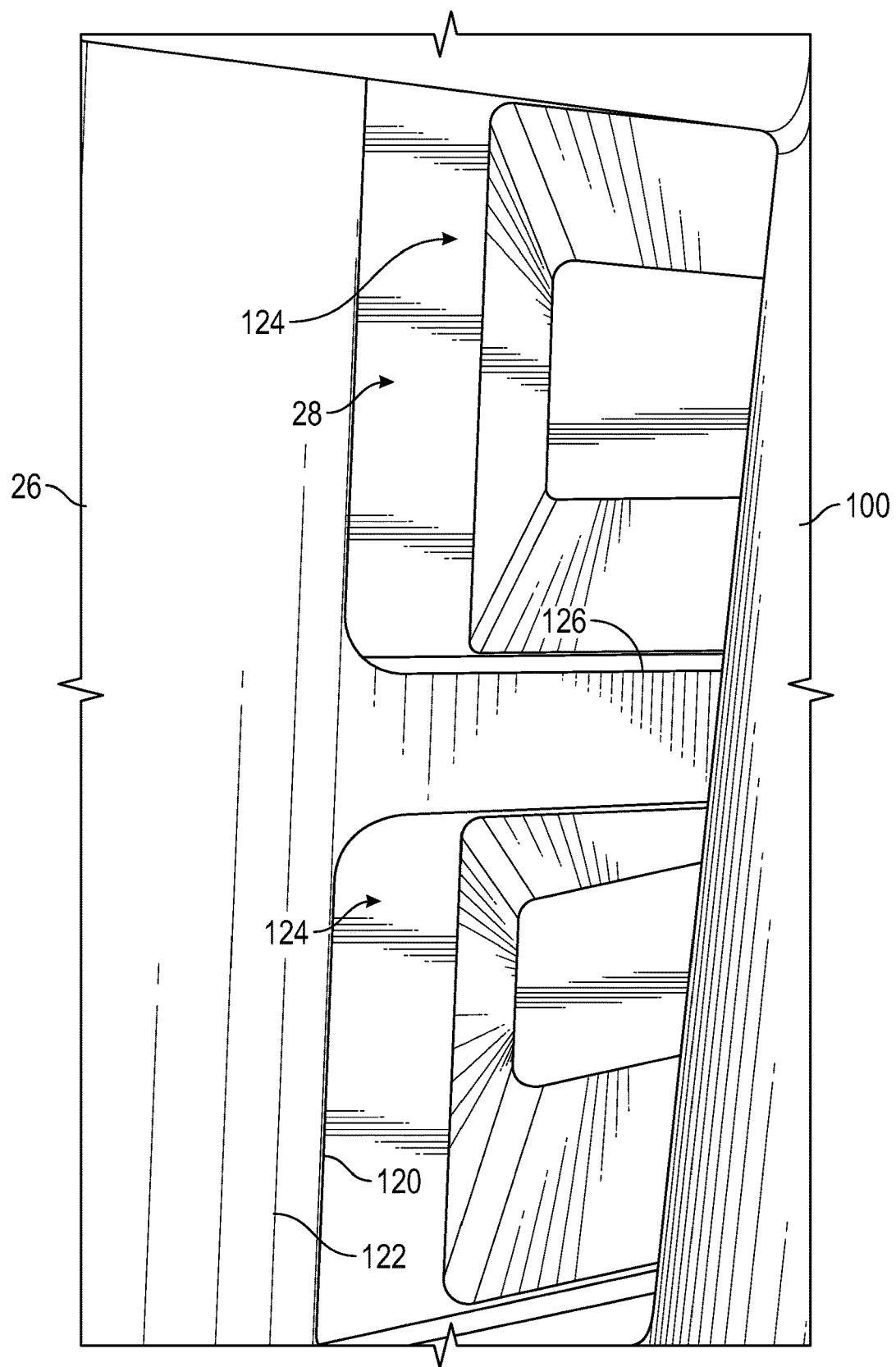
FIG. 7 is a detail perspective view showing a portion of the bottom plate of the hopper of the flexible mat forming system of FIG. 1.

As shown in FIGS. 5, 6, and 7, in an embodiment, the hopper 26 includes a bottom panel 122. In an embodiment, the bottom panel 122 has an arcuate shape corresponding to a curvature of the drum 14. In an embodiment, the bottom panel 122 has an opening that takes the form of spaced slots 120 that extend the length of the hopper 26. In an embodiment, the slots 120 may be shaped and positioned to align with the mold cavities 124 of the transverse row 22 of mold cavities (a subset of mold cavities 24 shown in FIGS. 4 and 8) of the facing row 28 of mold cavities of the drum 14. In an exemplary embodiment, the slots 120 are separated by dividers 126. In still other embodiments, the slots 120 have the same outer dimensions as at least some of the mold cavities 124 that come into alignment with them as the drum 14 rotates relative to the hopper 26. In other embodiments, the opening takes the form of a continuous, unbroken slot 120 that extends the entire length, or substantially the entire length, of the hopper 26 and is co-extensive with the arrangement of mold cavities 24 (FIG. 2) along the length of the drum 14. In still other embodiments, the opening is sized such that the slot 120 comprises the entire bottom of the hopper, eliminating the bottom panel 122.

An advantage of placing the slots 120 to align with the mold cavities 124 is that the alignment minimizes waste of the fresh cement paste 25 that is deposited in the hopper 26 by preventing fresh cement paste from being deposited between the mold cavities 124 on the outer periphery of the drum 14. As shown in FIGS. 5, 6, and 7, in an embodiment the plurality of slots 120 are arranged in a rectilinear row. In other embodiments, the slots make a non-linear pattern along, or partially along, the bottom panel 122. Each of the slots 120 may be of the same outer dimensions as the corresponding mold cavity 124 of the facing row of the plurality of rows 22 of mold cavities 24 formed on the outer periphery of the drum 14 that may pass beneath it as the drum 14 rotates.

As shown in FIGS. 1, 2, and 4, in an embodiment the hopper 26 is suspended from the supports 90, 92 of the frame 12. As shown in FIG. 2, in an embodiment the system 10 includes adjustable cables or chains 130, 132 that are attached to the support frames 90, 92 and extend downwardly to be attached to the panel 122 in the bottom of the hopper 26. To maintain the hopper 26 in position directly above the 12 o'clock position of the drum 14, in an embodiment the system 10 includes adjustable cables or chains 134, 136, that are attached at their upper ends to the upper portion 30 of the hopper 26 and extend downwardly to be attached at their lower ends to a transverse support beam 138 of the frame 12.

As shown in FIGS. 1 and 4, in an embodiment the hopper 26 is held in position above the uppermost portion of the drum 14 by adjustable cables or chains 140, 142 that are attached to posts 144, 146 of the frame 12. In an embodiment, the adjustable cables or chains 140, 142 also are lengthened and shortened to maintain the hopper 26 at the appropriate orientation above the drum 14. The clearance between the bottom surface 124 of the hopper 26 and the upper portion of the drum 14 is adjusted by appropriately lengthening or shortening the adjustable chains 130, 132 (see FIG. 2). With this structure, the hopper 26 may be suspended from the frame 12 to "float" above the upper portion of the drum 14, which in embodiments may be at approximately the 12 o'clock position, or in other embodiments, rest on the top of the drum 14 with a pre-set amount of weight force of the hopper.

Figure 8:
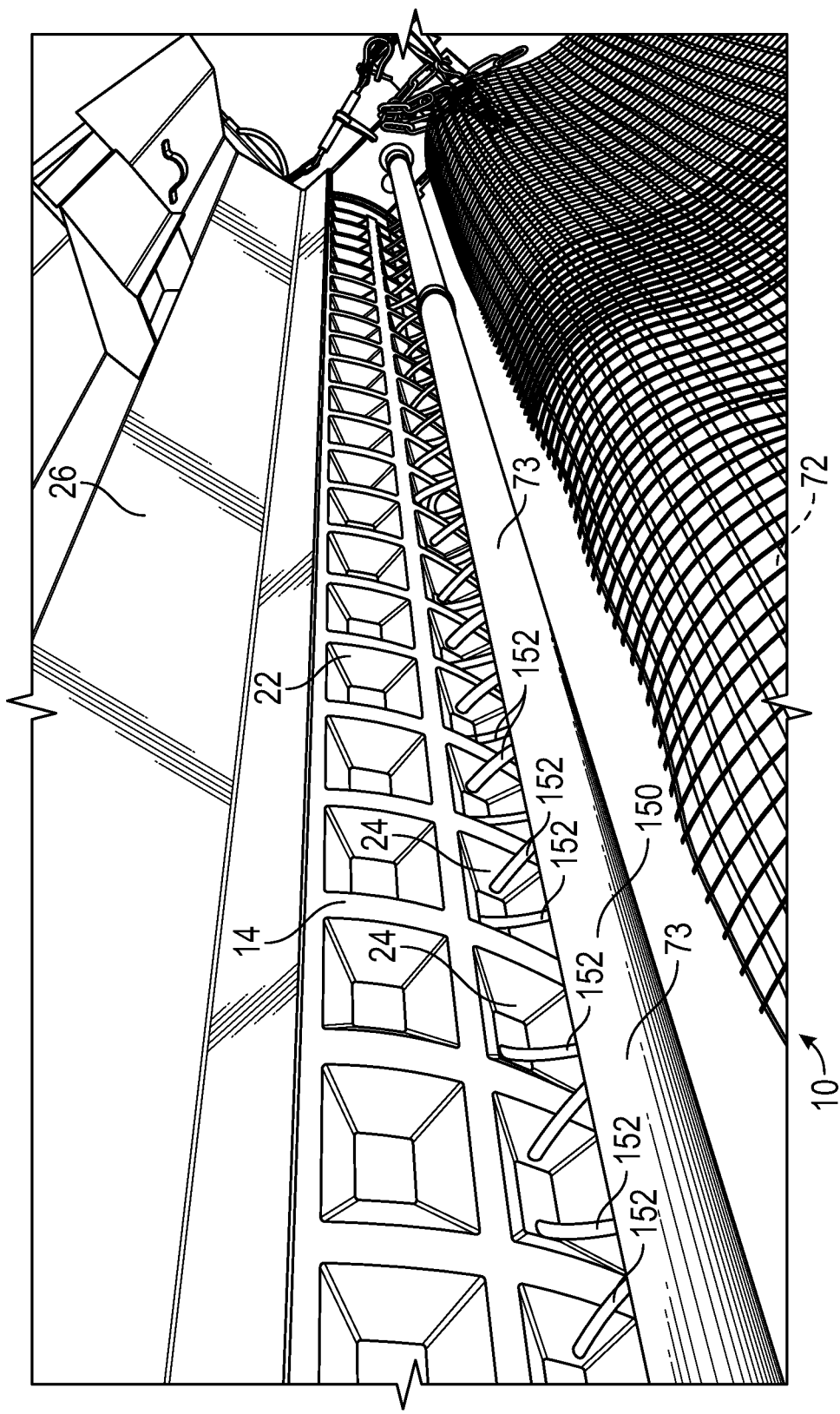
FIG. 8 is a perspective view of an embodiment of the cleaning member of the flexible mat forming system of FIG. 1.

As shown in FIGS. 1 and 8, the system 10 may include a cleaning member 150 that may be incorporated into the guide member 73. The cleaning member 150 may be positioned adjacent the elongate drum 14 and upstream of the hopper 26. The cleaning member 150 may include an implement for removing from the successive ones of the transverse rows 22 of mold cavities 24 a portion of the hardenable paste 25 (e.g., hydraulic Portland cement) that has not separated from the mold cavities to form the flexible mat 74. The implement may take the form of a plurality of protrusions 152 positioned to engage the mold cavities 24 formed in the outer periphery of the drum 14. The protrusions 152 may be flexible and shaped to extend into and scrape the surfaces of the mold cavities 24.

The cleaning member 150 may extend transversely of the drum 14 and may be positioned downstream of the lowermost position of the rows 22 of mold cavities 24, which also may be viewed as being positioned upstream of the mold cavities prior to their passing beneath the hopper 26. In the embodiment shown in FIG. 8, the protrusions 152 may take the form of a plurality of wire cable segments shaped and positioned to scrape surfaces of the mold cavities 24 of an adjacent one of the plurality of transverse rows 22 of mold cavities 24. The wire cable segments 152 may be formed to have frayed outer ends that brush the surfaces of the mold cavities 24 in the manner of a wire brush to remove hardened paste that has not adhered to the finished geogrid 58 to form the flexible mat 74. In the embodiment 10 shown in FIGS. 1 and 8, the sheet 58 of mesh material may be payed out from the roll 60 and extend over the guide member 73.

The foregoing components of the system 10 for forming a flexible mat provide an efficient operation and minimize the waste produced. The frame 12 may be moved by a separate device, such as a tractor or truck, so that, as the drum 14 rotates to deposit the finished flexible mat 74, the mat material is laid out on the ground 66 as a continuous sheet. In an embodiment, as shown in FIG. 1, a tractor 200, which may take the form of a telehandler, may be connected to the transverse support beam 138 by a cable 202 connected to a ring 204. In that embodiment, the tractor 200 may pull the frame 12 of the system 10 to the left in FIG. 1 over the ground 66, which motion makes the drum 14 rotate in the direction of arrow A, pulling the mesh material 58 from the spool assembly 26, under guide tube 72, over second guide tube 73, and between the outer periphery of the drum 14 and the underside of the bottom panel 122.

As the sheet 58 of mesh material, shown partially removed in FIG. 6 for clarity, passes beneath the hopper 26, the hardenable paste 25, which has been deposited into the hopper 26 and distributed by the auger 100 along the length of the hopper, falls through the slots 120 into the cavities 124 (a subset of the cavities 24 shown in FIGS. 4 and 8) to fill the cavities. The sheet 58 of mesh material, which is held against the outer periphery of the drum 14 by the bottom panel 122 and the tension of the mesh being payed out from the spool assembly 56 and the pinch between the bottom of the drum and the ground 66, becomes embedded in the paste held in the cavities 124.

The combination of the sheet 58 of mesh material and paste is held against the outer periphery of the drum 14 and the paste within the cavities 124, 24 as the transverse row 22 of mold cavities 124 rotate forwardly of the bottom panel 122 by the retaining plate 78. By the time the transverse row 22 of mold cavities 124 rotates beneath the retaining plate 78, the paste has hardened sufficiently to retain its shape as it falls by gravity downwardly from the mold cavities to the ground 66, forming the flexible mat 74 (FIG. 1). Further hardening of the paste into the blocks 76 may occur after the flexible mat 74 has separated from the drum 14 and been laid on the ground 66. The finished flexible mat 74 may thereafter be rolled up and transported to a desired location, where it may then be unrolled to form an erosion barrier.

After the flexible mat 74 has separated from the mold cavities 24, further rotation of the drum 24 brings the now-empty mold cavities upwardly into contact with the protrusions 152 of the cleaning member 150, which scrape any hardened paste from the cavities 24 as they pass by the cleaning member. The cleaned cavities 24 then again pass beneath the hopper 26 to be overlaid with mesh material 58 and receive hardenable paste 25 from the hopper 26.

In an exemplary embodiment, the system 10 for making a flexible mat 74 includes a form having a plurality of mold cavities 24, a panel 122 having an opening 120, and a frame 12 that adjustably supports the panel above the plurality of mold cavities and aligns the opening with adjacent ones of the mold cavities. The frame 12 spaces the panel above the mold cavities 24 a distance sufficient to receive the sheet 58 of mesh material between the panel 122 and the mold cavities. In the exemplary embodiment shown in FIG. 1, the form is the drum 14 having the plurality of mold cavities 24 formed in its outer cylindrical surface. In embodiments, the opening 120 takes the form of a plurality of slots, as shown in FIG. 6. In embodiments, the panel 122, which is a part of the hopper 26, is adjustably supported above the mold cavities 24 of the drum 14 by adjustable cables or chains 140, 142, and clearance between the bottom surface 124 of the hopper and the upper portion of the drum, and hence the spacing of the panel above the mold cavities, is adjusted by lengthening or shortening the chains 130, 132 as well.

In an exemplary embodiment of the method for making a flexible mat 74 using the system as described in the previous paragraph, the plurality of mold cavities 24, which may be formed on the drum 14, is provided, and the panel 122 having an opening 120 is provided. The panel 122 is positioned above the mold cavities 24 and the opening 120 is aligned with adjacent or corresponding ones of the mold cavities. In an embodiment, positioning the panel 122 above the adjacent ones of the mold cavities 24 includes adjusting a height of the panel above the mold cavities to a selected spacing between the panel and the mold cavities using the adjusting chains 130, 132 and 140, 142. A sheet 58 of mesh material is placed between the panel 122 and the mold cavities 24, and a hardenable paste 25 is deposited through the opening 120 and into the mold cavities such that the sheet of mesh material becomes embedded in the hardenable paste over the mold cavities. The hardenable paste 25 is allowed to harden into blocks 76 held together by the sheet 58 of mesh material, thereby forming the flexible mat 74, which in embodiments consists of or comprises a tied block mat. The flexible mat 74 is then removed from between the panel 122 and the mold cavities 24.

While the methods and forms of apparatus disclosed herein constitute preferred forms of the disclosed flexible mat forming system, it is to be understood that the system and invention are not limited to these precise forms apparatus and methods, and that changes may be made therein without departing from the scope of the disclosure.

What is claimed is:

1. A flexible mat forming system, comprising:
   a rotating drum having a plurality of mold cavities about an outer periphery thereof;
   a hopper positioned adjacent the drum, the hopper shaped to receive a hardenable paste and deposit the hardenable paste into successive mold cavities of the plurality of mold cavities facing the hopper, as the drum rotates relative to the hopper, the hopper including a bottom panel having an arcuate shape corresponding to a curvature of the rotating drum;
   wherein the hopper includes an opening shaped and positioned to align with the mold cavities facing the hopper; and
   a sheet of mesh material that is fed between the hopper and the successive mold cavities facing the hopper.

2. The flexible mat forming system of claim 1, wherein the mold cavities are arranged in a pattern on the drum, the pattern selected from a linear row of the mold cavities, a staggered pattern of the mold cavities, a checked pattern of the mold cavities, a random pattern of the mold cavities, a running bond pattern of mold cavities, and combinations of the foregoing.

3. The flexible mat forming system of claim 1, wherein the mold cavities have shapes selected from rectangular, square, hexagonal, octagonal, round, elliptical, irregular, and combinations of the foregoing.

4. The flexible mat forming system of claim 1, further comprising a support, wherein the mesh material is fed from the support to a location between the hopper and the mold cavities facing the hopper.

5. The flexible mat forming system of claim 1, wherein the bottom panel includes the opening shaped such that hardenable paste deposited into the hopper flows through the opening to fill the successive mold cavities facing the hopper.

6. The flexible mat forming system of claim 5, wherein the opening includes a plurality of slots through which the hardenable paste flows from the hopper to the mold cavities, and the plurality of slots extends transversely of the hopper.

7. The flexible mat forming system of claim 6, wherein slots of the plurality of slots are arranged in a rectilinear row.

8. The flexible mat forming system of claim 6, wherein slots of the plurality of slots have the same outer dimensions as at least some of the mold cavities.

9. The flexible mat forming system of claim 1, further comprising a frame; and
wherein the rotating drum is rotatably mounted on the frame, the hopper is positioned on the frame adjacent the drum, and the hopper is suspended from the frame to form a gap between the mold cavities facing the hopper a sufficient distance to allow the sheet of mesh material to pass between the hopper and the mold cavities facing the hopper.

10. The flexible mat forming system of claim 9, wherein the hardenable paste is selected from a fresh cement paste, optionally wet-cast Portland cement, concrete, a mixture of Portland cement, sand, and/or gravel, and a polymer; and the mesh material is a geogrid.

11. The flexible mat forming system of claim 9, wherein the hopper is positioned above uppermost ones of the plurality of mold cavities.

12. A method for making a flexible mat, the method comprising:
providing a plurality of mold cavities;
providing a panel having an opening;
positioning the panel above the mold cavities and aligning the opening with the mold cavities;
varying a height of the panel above the mold cavities to a selected spacing;
placing a sheet of mesh material between the panel and the mold cavities;
depositing a hardenable paste through the opening and into the mold cavities such that the sheet of mesh material becomes embedded in the hardenable paste over the mold cavities;
displacing the panel from the mold cavities as the hardenable paste hardens in the mold cavities into blocks held together by the mesh, thereby forming the flexible mat; and
removing the flexible mat from the mold cavities.

13. The method of claim 12, wherein placing a sheet of mesh material includes placing a sheet of geosynthetic material between the panel and the mold cavities.

14. The method of claim 12, wherein providing a plurality of mold cavities includes providing mold cavities shaped to form pyramidal blocks.

15. The method of claim 12, further comprising preventing the hardenable paste from being deposited onto the sheet of mesh material between the mold cavities by separating the opening into a row of slots by dividers.

16. The method of claim 12, wherein placing a sheet of mesh material includes placing a sheet of mesh material between the panel and the mold cavities and spacing the panel from the mold cavities to hold the sheet of mesh material against the mold cavities.

17. A system for making a flexible mat, the system comprising:
a form having a plurality of mold cavities;
a panel having an opening;
a support frame for adjustably supporting the panel above the plurality of mold cavities and aligning the opening with adjacent ones of the mold cavities; and
the panel is spaced above the mold cavities a distance sufficient to receive a sheet of mesh material between the panel and the mold cavities.

18. A method for making a flexible mat, the method comprising:
providing a plurality of mold cavities;
providing a panel having an opening;
positioning the panel above the mold cavities and aligning the opening with adjacent ones of the mold cavities, wherein positioning the panel above adjacent ones of the mold cavities includes adjusting a height of the panel above the mold cavities to a selected spacing;
placing a sheet of mesh material between the panel and the mold cavities;
depositing a hardenable paste through the opening and into the mold cavities such that the sheet of mesh material becomes embedded in the hardenable paste over the mold cavities;
allowing the hardenable paste to harden into blocks held together by the sheet of mesh material, thereby forming the flexible mat; and
removing the flexible mat from between the panel and the mold cavities.

19. A method for making a flexible mat, the method comprising:
providing a plurality of mold cavities;
providing a panel having an opening;
positioning the panel above the mold cavities and aligning the opening with the mold cavities;
placing a sheet of mesh material between the panel and the mold cavities;
depositing a hardenable paste through the opening and into the mold cavities such that the sheet of mesh material becomes embedded in the hardenable paste over the mold cavities;
preventing the hardenable paste from being deposited onto the sheet of mesh material between the mold cavities by separating the opening into a row of slots by dividers;
displacing the panel from the mold cavities as the hardenable paste hardens in the mold cavities into blocks held together by the mesh, thereby forming the flexible mat; and
removing the flexible mat from the mold cavities.

20. A flexible mat forming system, comprising:
a rotating drum having a plurality of mold cavities about an outer periphery thereof;
a hopper positioned adjacent the drum, the hopper shaped to receive a hardenable paste and deposit the hardenable paste into successive mold cavities of the plurality of mold cavities facing the hopper, as the drum rotates relative to the hopper, the hopper including an opening shaped and positioned to align with the mold cavities facing the hopper;
an auger positioned in the hopper that distributes the hardenable paste along a length of the hopper; and
a sheet of mesh material that is fed between the hopper and the successive mold cavities facing the hopper.

* * * * *